Patented Feb. 2, 1943

2,309,739

UNITED STATES PATENT OFFICE 2,309,739

2-AMINOPYRIMIDINES

Richard O. Roblin, Jr., Old Greenwich, and Jackson P. English, Stamford, Conn., assignors to American Cyanamid Company, New York, N. Y., a corporation of Maine No Drawing. Application October 23, 1940, Serial No. 362,418

4 Claims. (Cl. 260—251)

This invention relates to an improved process of producing 2-aminopyrimidines.

The present application is in part a continuation of our copending application Serial No. 331,754 filed April 26, 1940.

In the past 2-aminopyrimidines have been produced by processes operating in alkaline medium. Processes have also been proposed for producing pyrimidines using an acid medium but they did not introduce an amino group directly into the 2 position. On the contrary, compounds were produced having other groups in this position which then had to be transformed into amino groups to produce the 2-aminopyrimidines.

The process of the present invention produces 2-aminopyrimidines directly in one step. Essentially the process consists in condensing in acid medium, guanidine salts with compounds having the formula:

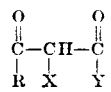

where R=H or alkyl, X may be H, halogen, nitro, alkyl, etc., and Y may be H, OH, halogen, alkyl, alkoxy, etc. Ring closure is effected, the guanidine reacting with the other reagent to produce the six-membered pyrimidine ring.

The process of the present invention can be used to produce directly, compounds in which the 2-aminopyrimidine ring is not substituted by other groups. However, this requires the use of a difficultly obtainable reagent having the formula CHO.CH$_2$CHO. Compounds in which the 2-aminopyrimidine ring contains a hydroxy group can be very cheaply prepared by condensing a guanidine salt with formylacetic acid, producing in good yields the 2-aminopyrimidine compound, isocytosine. It is not necessary that the formylacetic acid be used in the chemically pure state. On the contrary, an impure reaction mixture containing formylacetic acid produced by the treatment of malic acid with fuming sulfuric acid is entirely satisfactory, and it is an advantage of the present invention that relatively impure reagents can be employed which clearly reduces the cost. Other pyrimidines can be prepared by the reaction of guanidine compounds on acetyl acetone, esters of acetoacetic acid, and the like.

The present invention operates effectively with substantially any guanidine salts. For practical purposes it is preferred to use the cheap guanidine salts, such as the sulfate, but the nature of the anion is not critical as it does not appear to enter into the reactions except in the case of acids which would be capable of reacting with the compounds produced or with the reagents. Hence, other guanidine salts, such as the carbonate, hydrochloride, and the like, may be used.

The invention will be described in conjunction with the following specific examples which are illustrations of the present process in the production of isocytosine and other pyrimidines but is not limited to the details therein set forth. The parts are by weight except for liquids where the corresponding parts by volume are used.

Example 1

1,600 parts of 20% fuming sulfuric acid are cooled by stirring in a solid carbon dioxide-alcohol bath until they begin to freeze. Thereupon 360 parts of malic acid, which represents a slight excess, is slowly added with vigorous stirring while maintaining the temperature below 4° C. After all of the malic acid has been stirred in, 300 parts of dry guanidine sulfate are added. The addition of the guanidine sulfate may be more rapid than that of the malic acid but good stirring is desirable. During the addition of the guanidine sulfate the oleum melts, but the temperature does not substantially exceed 4° C. The mixture, after the addition of all the guanidine sulfate, is permitted to warm spontaneously to room temperature and then is heated cautiously by indirect steam heat with vigorous stirring for about an hour.

The reaction mixture is then cooled with ice water and poured onto 5,000 parts of ice. The aqueous solution resulting is then neutralized with approximately 5,250 parts of 28% aqueous ammonia solution, the temperature rise being avoided by cooling with ice. After standing for several hours, the precipitate which forms is filtered and dried at about 60° C., the yield being about 200 parts, representing a 69% yield of theory. The melting point of the crude product thus obtained is 268° C. If it is desired to purify the crude product, it is dissolved in 1,600 parts of boiling water, boiled with decolorizing carbon for about 20 minutes and then cooled and the product crystallizes out. 148 parts of pure product having a melting point of 275° C. is thus obtained. The mother liquors may be concentrated and further amounts recovered.

Example 2

The procedure of Example 1 is followed up to the production of an aqueous solution by pouring the reaction mixture onto the ice. Instead of neutralizing with 5,250 parts of aqueous ammonia solution, a smaller amount of ammonia is used, preferably about 4,300 parts, which represents an amount of ammonia insufficient to neutralize all of the acid in the reaction mixture.

Filtration is then effected immediately before the desired product has precipitated in any considerable amount. This removes impurities which precipitate immediately on neutralization. Following the first filtration, further amounts of ammonium hydroxide are added to completely neutralize the filtrate. After standing for several hours the desired product then precipitates out and is filtered and dried at about 60° C. The product is much purer than in Example 1 but the yield is smaller, dropping to about 150 parts. This loss in yield does not represent a corresponding loss of pure product as on recrystallization from boiling water a smaller loss is noted. However, the product produced by the above modification is sufficiently pure so that after a much simpler and cheaper purification procedure which forms the subject matter of the application of J. P. English, Serial No. 331,752, filed April 26, 1940, the resulting product is sufficiently pure for use as an intermediate in the production of unsubstituted 2-aminopyrimidine, an intermediate useful in the production of chemotherapeutic agents of the sufanilamidopyrimidine type.

*Example 3*

2-amino-4-oxy-6-methyl pyrimidine

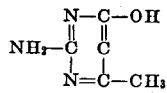

100 parts of 20% fuming sulfuric acid was cooled in a dry ice-alcohol bath until freezing began. 35 parts of guanidine sulfate was then added with stirring below 4° C. To the stirred mixture was slowly added 40 parts of ethyl acetoacetate below 0° C. The reaction mixture was then allowed to warm to room temperature and afterwards heated on the steam bath for an hour.

The reaction mixture was then cooled and poured onto 250 parts of ice. The solution was then neutralized with about 300 parts of 28% aqueous ammonia and allowed to stand. The 2-amino-4-oxy-6-methyl pyrimidine separates in the course of a few hours and may be purified by recrystallization from a large volume of water or according to the application of J. P. English above referred to.

*Example 4*

2-amino-4,6-dimethyl pyrimidine

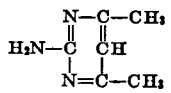

900 parts of 20% fuming sulfuric acid was cooled in a dry ice-alcohol bath until it began to freeze. Then 300 parts of guanidine sulfate was added slowly below 4° C. with vigorous stirring. To the stirred mixture was then added slowly 270 parts of acetyl acetone below 4° C. The mixture was allowed to warm spontaneously to room temperature and was then heated for one hour on the steam bath.

The reaction mixture was cooled in ice and then poured with stirring onto 2,250 parts of ice. The latter cooled solution was neutralized with about 4600 parts of 40% caustic solution. The cooled solution was filtered from the separated sodium sulfate and the filtrate concentrated in vacuo.

The concentrate was made strongly alkaline by the addition of solid caustic and the separated 2-amino-4,6-dimethyl pyrimidine was collected. This crude material could be purified by crystallization from alcohol or benzene.

*Example 5*

2-amino-4-oxy-5,6-dimethyl pyrimidine

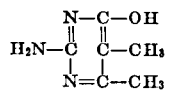

To 90 parts of 20% fuming sulfuric acid, 30 parts of dry guanidine sulfate was slowly added with stirring below 4° C. To the stirred mixture was added 40 parts of ethyl methyl acetoacetate below 4° C. The mixture was allowed to warm to room temperature and then heated on the steam bath for one hour.

The reaction mixture was cooled in ice water and poured onto 225 parts of ice. The latter solution was neutralized while being cooled, with about 272 parts of 28% aqueous ammonia. After standing several hours the 2-amino-4-oxy-5,6-diamino pyrimidine separated and was collected and dried. The yield was about 20 parts and the material could be purified by crystallization from a large volume of water.

We claim:

1. A method of producing 2-aminopyrimidines which comprises condensing a guanidine salt with a compound of the general formula:

in which R is a member of the group consisting of hydrogen and alkyl radicals, X is a member of the group consisting of hydrogen, halogen, nitro, and alkyl radicals, and Y is a member of the group consisting of hydrogen, hydroxy, halogen, alkyl, and alkoxy radicals in a large quantity of strong acid.

2. A method of producing 2-amino-4,6-dimethyl pyrimidine which comprises condensing a guanidine salt with acetyl acetone in a large quantity of strong acid.

3. A method of producing 2-amino-4-oxy-5,6-dimethyl pyrimidine which comprises condensing a guanidine salt with an ester of methyl acetoacetic acid in a large quantity of strong acid.

4. A method of producing 2-amino-4-oxy-6-methyl pyrimidine which comprises condensing a guanidine salt with an ester of acetoacetic acid in a large quantity of strong acid.

RICHARD O. ROBLIN, Jr.
JACKSON P. ENGLISH.